United States Patent
Kirchner et al.

(10) Patent No.: US 8,987,485 B2
(45) Date of Patent: Mar. 24, 2015

(54) METHOD FOR FRACTIONATING JATROPHA SEEDS

(75) Inventors: Stefan Kirchner, Gütersloh (DE); Detlef Ullmann, Oelde (DE); Ines Speiser, Verl (DE)

(73) Assignee: GEA Mechanical Equipment GmbH, Oelde (DE)

(*) Notice: Subject to any disclaimer, the term of this patent is extended or adjusted under 35 U.S.C. 154(b) by 90 days.

(21) Appl. No.: 13/996,165

(22) PCT Filed: Dec. 16, 2011

(86) PCT No.: PCT/EP2011/073108
§ 371 (c)(1),
(2), (4) Date: Sep. 10, 2013

(87) PCT Pub. No.: WO2012/084729
PCT Pub. Date: Jun. 28, 2012

(65) Prior Publication Data
US 2013/0345456 A1     Dec. 26, 2013

(30) Foreign Application Priority Data
Dec. 21, 2010 (DE) .......................... 10 2010 055 419

(51) Int. Cl.
| | | |
|---|---|---|
| C11B 1/10 | (2006.01) |
| C10L 1/18 | (2006.01) |
| C11B 3/04 | (2006.01) |
| A23L 1/211 | (2006.01) |
| A23L 1/30 | (2006.01) |
| C10G 1/04 | (2006.01) |
| C10L 1/02 | (2006.01) |
| C11B 1/02 | (2006.01) |

(52) U.S. Cl.
CPC ............... *C10L 1/1802* (2013.01); *C11B 3/04* (2013.01); *A23L 1/2112* (2013.01); *A23L 1/3002* (2013.01); *A23L 1/3006* (2013.01); *C10G 1/047* (2013.01); *C10G 2300/1014* (2013.01); *C10L 1/02* (2013.01); *C11B 1/02* (2013.01); *C11B 1/10* (2013.01)
USPC ............... 554/17; 554/10; 554/175; 554/207

(58) Field of Classification Search
None
See application file for complete search history.

(56) References Cited

U.S. PATENT DOCUMENTS

| | | | | |
|---|---|---|---|---|
| 4,808,426 A | * | 2/1989 | Strop et al. ..................... | 426/417 |
| 2011/0281017 A1 | * | 11/2011 | Brooker ....................... | 426/630 |

FOREIGN PATENT DOCUMENTS

| | | | |
|---|---|---|---|
| EP | 0 267 933 | 5/1988 | |
| EP | 2 163 159 | 3/2010 | |
| GB | 1179584 | 1/1970 | |
| GB | 1 402 769 | 8/1975 | |
| WO | 98/53698 | 12/1998 | |
| WO | WO 2010/070264 A1 | * 6/2010 | ............... A23K 1/14 |
| WO | 2010/092143 | 8/2010 | |

OTHER PUBLICATIONS

J. Martinex-Herrera et al., "Chemical Composition, toxic/Antimetabolic Constituents, and Effects of Different Treatments on Their Levels, in four Provenances of *Jatropha curcas* L. From Mexico", Food Chemstry, vol. 96, (2006) pp. 80-89.
Haas et al., "Detoxification Experiments With the Seed Oil from *Jatropha curcas* L." Industrial Crops and Products, vol. 12, (2000) pp. 111-118.
German Search Report for Application No. PCT/EP2011/073108, dated Dec. 16, 2011.

* cited by examiner

*Primary Examiner* — Yate K Cutliff
(74) *Attorney, Agent, or Firm* — Crowell & Moring LLP

(57) ABSTRACT

A method for the solvent-free fractionation of jatropha seeds having a phorbol ester content and at least one fraction.

25 Claims, 5 Drawing Sheets

METHOD FOR FRACTIONATING *JATROPHA* SEEDS

This application is a national stage of International Application PCT/EP2011/073108, filed Dec. 16, 2011, and claims benefit of and priority to German Patent Application No. 10 2010 055 419.7, filed Dec. 21, 2010, the content of which Applications are incorporated by reference herein.

The present disclosure relates to a method for fractionating jatropha seeds.

EP 0 267 933 A1 discloses a process for obtaining vegetable oil, in which at least one reagent for reducing the phospholipid content is added to the oil-containing material. Plants such as, for example, soybeans or maize are cleaned, dried and dehulled in preparatory steps. Those plant parts can then be ground. Here, for example, oil is additionally added. In the extraction of vegetable oil from these soybeans or maize, hydrochloric acid, among other things, is also employed. This is used to reduce the phospholipid content. A hydrophobic phospholipid is converted into a hydratable species. However, because the hydration of phospholipids is reversible, chelating agents, precipitating agents or the like must additionally be used in order to stabilize the phospholipids in the aqueous solution.

GB 1 179 584 A discloses a process for obtaining fats. The aqueous extraction of animal fats was therein optimized by extracting such a fat in a pH range of from 4.1 to 5.8. That pH value can be achieved, among other things, by addition of acids, for example hydrochloric acid, sulfuric acid, citric acid or acetic acid.

WO 98/53698 A1 and EP 1 905 309 A1 disclose the processing of rapeseeds, soybeans, maize and sunflower seeds. These are first ground. Solids are then removed. Finally, washing of the oil phase is carried out, it being possible to establish a pH value of from 2 to 10 during washing, by addition of Tris-HCl. Formulation to an emulsion is then carried out. This emulsion is used in the foodstuffs sector and in the feeds sector, but also in connection with pharmaceutical and cosmetic products.

GB 1 402 769 A discloses a process for obtaining oil by an enzymatic process. Following the enzymatic treatment, which is carried out at pH values from pH=3 to pH=6, decomposition of the cell walls of the oil-containing plant product takes place with liberation of the oil within from 2 to 24 hours.

EP 2 163 159 A1 discloses the production of oil from rapeseed. After preparation and dehulling of the rapeseed, pressing of the rapeseed is carried out, in which a press cake and rapeseed oil are formed. In a process step known as "degumming", the rapeseed oil is freed of phospholipids, which agglomerate in a reaction tank. This is followed by a process step of drying and esterification, in which biodiesel and crude glycerol are separated by transesterification. In further subsequent steps, proteins and various other reusable materials can be obtained from the different fractions of the rapeseed oil or of the rapeseed press cake. The process described here has only limited suitability for the production of fuels, because the oil yield from the pressing of dehulled rapeseed is very low. Owing to the high residual fat content in the de-oiled press cake, the latter can be utilized to only a limited degree.

In the use of fuels from oil plants, oil from jatropha seeds, also called purging nuts, has been found to be a valuable alternative, because jatropha oil has a higher cetane number compared with rapeseed oil, for example, and because the jatropha plant also grows in nutrient-poor soils.

Today's methods primarily use pressing of the jatropha seeds. In order to achieve a high yield, an appreciable husk content in the product is essential. The by-products that form are applied to the jatropha plantations again as fertilizers or are compressed to form pellets and marketed as a combustion fuel.

Because jatropha also contains a high proportion of high-quality proteins in addition to oil, efforts should be made to obtain the by-products that form during oil production in such a manner that they can be marketed as a high-quality feed.

Problems here are the relatively high proportion of woody constituents, which constituents are indigestible, in the husk of the seed and the high content of phorbol esters, which have a toxic action on most animals.

However, the method of pressing used today, for example, eccentric screw pressing, requires the husk content in order to press out the oil, and the press cake accordingly contains all the husk components.

This product thus has a relatively low protein content and a high proportion of indigestible components, and is, accordingly in principle, not usable as feed or is usable to only a limited degree.

A possible detoxification process, that is to say substantially the separation of phorbol esters from the press cake by means of methanol, is described in WO 2010/092143 A1. According to that teaching, phorbol ester is extracted by means of a technically very complex process, but without significantly changing the protein content of the product. Phorbol ester is removed from the material by repeated extraction by means of methanol in a ratio of 1:10. The introduction to the description of WO 2010/092143 A1 additionally describes further processes for reducing the phorbol ester content of jatropha seed, which processes, however, have the common problem of only limited economy.

For example, owing to the properties of methanol, for example, explosive, toxic, valuable, the complete separation and recovery of large amounts of the solvent is a requirement for economical operation. This makes this process expensive, so that the economical use of this process is problematic.

A conventional hexane extraction cannot be used to diminish the phorbol esters because they are insoluble or only sparingly soluble in hexane.

Embodiments according to the present disclosure are directed to more economical processes, as in the following methods. A method for the solvent-free fractionation of dehulled and comminuted jatropha seeds that have a phorbol ester content, in which at least the following fractions are obtained: a meal fraction having a reduced phorbol ester content relative to the phorbol ester content of the jatropha seeds; a jatropha oil containing phorbol esters. The method steps include providing jatropha seeds; comminuting the jatropha seeds; adding water and acid to the comminuted jatropha seeds to form an oil-containing suspension, wherein the pH value of the suspension is adjusted to ≤3.5; separating jatropha oil from the oil-containing suspension in a centrifugal field to form the jatropha oil and the meal fraction; adding vegetable oil that is one of free of phorbol esters and has a reduced phorbol ester content, to the meal fraction; and separating an oil phase from the meal fraction in a centrifugal field. A method for the solvent-free fractionation of jatropha seed that has not been dehulled and that has a phorbol ester content, in which at least the following fractions are obtained: a husk fraction; a meal fraction having a reduced phorbol ester content relative to the phorbol ester content of the seed; and a jatropha oil containing phorbol esters; the method steps comprising: providing jatropha seeds; dehulling the seeds to form the husk fraction and dehulled jatropha seeds; comminuting the dehulled jatropha seeds; adding water and acid to the comminuted jatropha seeds to form an oil-containing suspension, wherein the pH value of the suspension is adjusted to ≤3.5; separating jatropha oil from the oil-containing suspension in a centrifugal field to form the jatropha oil and the meal fraction; adding vegetable oil that is one of free of phorbol esters and has a reduced phorbol ester content to the meal fraction; and separating an oil phase from the meal fraction in a centrifugal field. A method for reducing the phorbol ester content of a de-oiled jatropha seed meal, comprising the following method steps: providing de-oiled jatropha seed meal; adding vegetable oil that is one of free of phorbol esters and has a reduced phorbol ester content, to the meal, and separating an oil phase from the meal in a centrifugal field to obtain the meal having a reduced phorbol ester content.

Further embodiments according to present disclosure are discussed herein and in the claims.

In addition to the use of a crude oil as a fuel, further constituents of the jatropha seed can also be utilized very economically. In the embodiments according to the present disclosure, different numbers of reusable-material phases are advantageously obtained from jatropha seeds that have been pre-processed in different ways or that have not been pre-processed.

The methods according to the present disclosure differ significantly from known methods used today because the main components, husks (40%), oil (35%), protein-rich meal (25%) and phorbol esters, can be obtained separately.

Moreover, owing to the separation of phorbol esters, the protein-rich meal can be used as a feed. In that manner, a significantly improved added value can be achieved as compared with the conventional methods. The husk components of the jatropha seeds, which can account for up to 40% of the total weight, are removed. They can be used, for example, to generate power for the plant, which can be important, for example, in remote areas without a power supply. The protein content in the de-oiled meal can thus be increased from about 18% to 55%.

A further requirement for the use of the protein-rich meal is to reduce the phorbol ester content so that the meal can safely be used as animal food.

The crude oil obtained, in accordance with embodiments of the present disclosure, is an intermediate in the production of a fuel. It contains a proportion of residual water and optionally also smaller solid particles of the plant seed.

Oil polishing, which may be used as an addition, is a method of cleaning the oil. The crude oil is processed further by use of filtration technology or separation technology and is cleaned of or separated from solids residues and water. The solids content of the polished crude oil is reduced to the extent that this oil can be used as a fuel. The residual water content in the fuel is lowered, for example, to 0.1% by weight or less by drying.

The solid phase obtained in the oil separation is an intermediate in the production of a protein-rich meal.

The oil thus obtained is extremely low in phosphates, magnesium and calcium and complies with the standard for biofuels, that is, DIN 51605, when polished without further processing. Unlike pressed oils, complex refining of oils can thus be avoided.

By the addition of oil that has no or only a very low phorbol ester content, that is, sufficiently lower than in the meal whose phorbol ester content is to be reduced, phorbol esters that have remained in the wet meal are transferred into the oil phase. By separating off the oil, the phorbol ester content in the meal is lowered sufficiently that it can be used as a feed.

The meal can, for example, be used for the feeding of animals.

According to embodiments of the present disclosure, fractionation of jatropha seeds, that is to say of the purging nuts of the jatropha plant, is carried out.

Embodiments of the methods of the present disclosure are further discussed herein and in the appended claims.

A requirement for separation of phorbol esters and for obtaining protein-rich meal is first the effective separation of the oil.

In the following, the pH value adjustment of the meal 200, as shown, for example, in FIG. 5, will first be discussed.

Water and acid can be fed separately to the suspension or can be mixed to form a dilute acid before being added to the suspension. In such a case, the dilute acid already has an appropriate concentration prior to the addition in order to adjust the pH value of the suspension to 3.5 or less.

In the production of fuel from jatropha seeds having a fat content of more than 30% by weight, or, for example, more than 40% by weight, it has been found, surprisingly, that the yield of crude oil increases significantly at a pH value of less than 3.5.

Although a significant increase in the yield of oil is already to be observed at a pH value of ≤3.5 as compared with processing at neutral pH, a particularly advantageous increase in the yield can, however, be achieved with a suspension having a pH value ≤3.2.

A further increase in the yield of oil can be achieved by carrying out the adjustment of the pH value of the suspension specifically by use of hydrochloric acid. Crude oil can be liberated from the comminuted plant seeds or nuts as extensively as possible with a dwell time of at least 30 minutes, or, for example, from 30 to 60 minutes, after addition of the acid. Because a higher temperature facilitates the liberation of the crude oil from the plant seeds or nuts, it is, for example, advantageous for a temperature of from 60 to 80° C., or, for example, from 80 to 95° C., to be established in the product with the added water.

The plant seeds can be cleaned before being comminuted, in order thus to remove foreign matter adhering to the plants. In addition, the proportion of solids and foreign substances in the suspension can be reduced before comminution by prior dehulling and drying.

Alternatively or in addition, according to the present disclosure, the yield of fuel can be increased by carrying out the comminution of the plant seeds or nuts by use of a mill having a fine degree of grinding. As a result of the finer degree of grinding of the plant seeds or nuts, less crude oil is retained inside the solid components.

The separation of the crude oil can, within the scope of the present disclosure, take place from the suspension by repeated de-oiling. After a first de-oiling, the suspension, with a content of crude oil of 4 percent or less, is introduced into a second decanter or returned to the decanter of the first de-oiling for further de-oiling of the suspension.

The phorbol esters still present in the product can be extracted by mixing the aqueous solid phase so obtained with oil that does not contain phorbol esters.

That oil with the dissolved phorbol esters is then separated off in the decanter. The extractant used may be extraneous oil or, for example, may be, jatropha oil, from which the phorbol esters have previously been separated by suitable processes.

Washing of the crude oil in order to obtain the fuel can, for example, advantageously be carried out in a centrifuge, or, for example, in a separator.

Other aspects of the present disclosure will become apparent from the following descriptions when considered in conjunction with the accompanying drawings.

DETAILED DESCRIPTION

Figure 1:
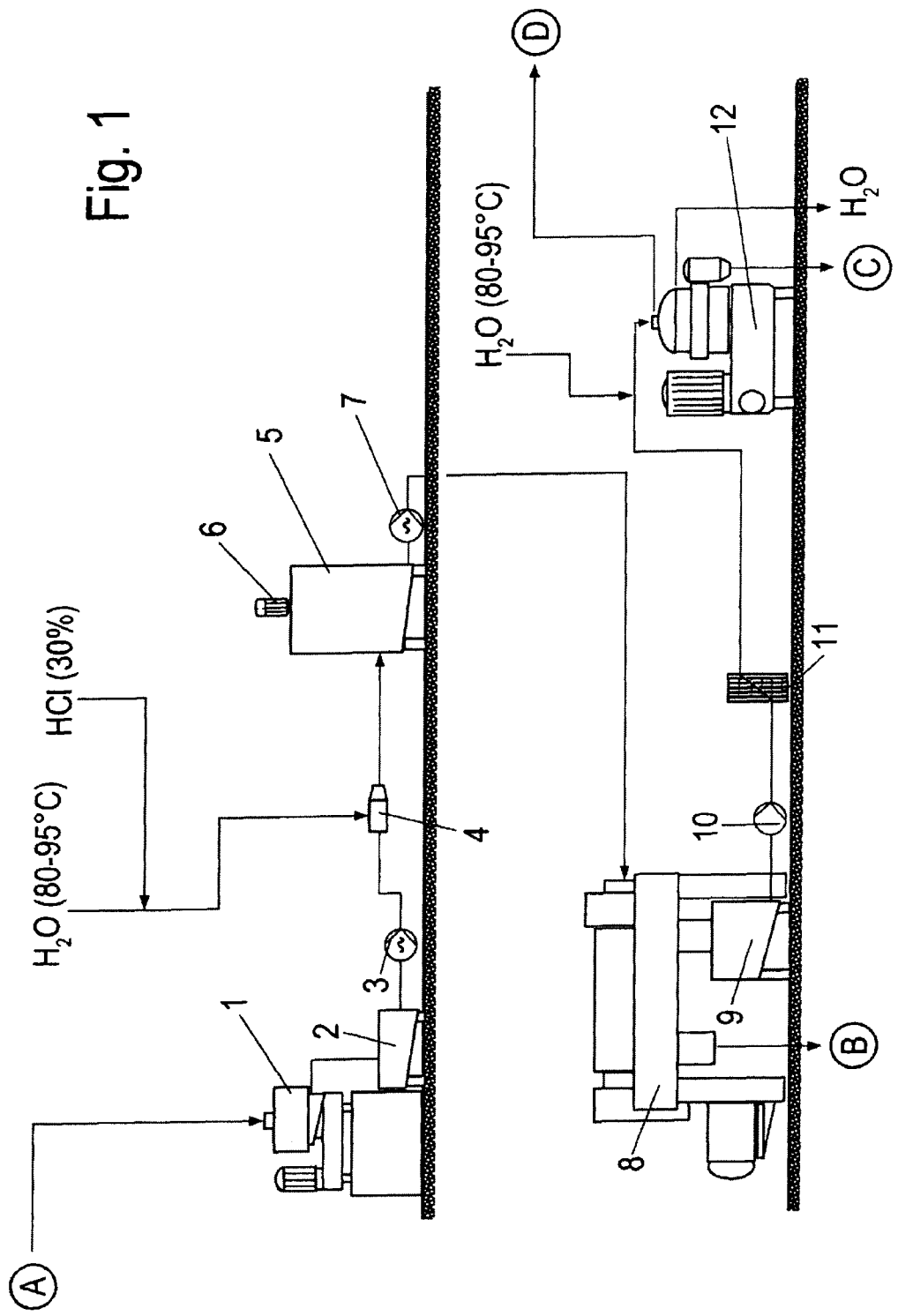
FIG. 1 shows a plant for obtaining a fuel from jatropha seeds, in accordance with the present disclosure.

FIG. 1 shows, schematically, a plant with which, in an embodiment of the present disclosure, jatropha seeds A are processed into a crude jatropha oil D which is suitable as a fuel. The jatropha seeds, or nuts A, having, for example, previously been cleaned and dehulled.

In a first step of the treatment, the jatropha seeds A are first transferred to a mill 1 for comminution. The nuts A are here broken up and comminuted in a grinder. This grinding process can, within the scope of the present disclosure, be additionally facilitated by the supply of further oil. The fragments of the comminuted jatropha seeds have a specific mean grain size, which is specified by the grinder. This can be carried out in slotted mills, for example.

Before being comminuted, the jatropha seeds A, may, for example, be dehulled and/or dried. These preparatory steps facilitate the comminution, or grinding, of the jatropha seeds A. At the same time, the protein content is increased significantly by removal of the husk components.

The embodiments according to the present disclosure include an important advantage over conventional methods used today, because the husk fraction can now be used separately, and the protein content of the de-oiled meal permits its use, for example, as animal food.

After grinding, the comminuted jatropha seeds are transferred in the form of an oil/solid mixture to a buffer tank 2. From there, they are transported by way of a first eccentric screw pump 3 to a mixer or mixing station 4.

In the mixing station 4, hot water and acid, for example, hydrochloric acid, HCl, are fed to the ground product and mixed in such a manner that the suspension has an elevated temperature of from 60 to 80° C., or, for example, from 80 to 95° C. During this introduction of hot water and acid, a suspension of solids, oil and water having a pH value of ≤3.5 is formed.

In order to increase the yield of fuel and to obtain a meal having a low oil content, it is very important that the suspension formed has a pH value of ≤3.5.

The hot water and the acid, for example, concentrated hydrochloric acid, can also be introduced separately into the mixing station and form a suspension having a pH value of ≤3.5 by intensive stirring.

Although this sequence of method steps may not be preferred, because a locally high concentration of acid is formed in the suspension, it can be used as an alternative, in accordance with the present disclosure, to the addition of a dilute acid to form a suspension.

In a further, embodiment according to the present disclosure that may not be preferred, a different acid, for example sulfuric acid or citric acid, can also be used instead of hydrochloric acid to adjust the pH value.

The suspension is then, for example, transferred to a dwell container 5. It has been found, surprisingly, that the crude oil yield can, for example, advantageously additionally be increased in the course of a dwell time. Sedimentation is prevented by gentle stirring and thus improves the yield. To that end, the dwell container 5 has a stirrer 6.

The dwell time in the dwell container 5 can, for example, be from 30 to 60 minutes. Depending on the crude material and the acid used, the crude oil yield can even fall slightly again with a longer dwell time.

From the dwell container 5, the suspension is transported by way of a second eccentric screw pump 7 to a decanter 8. This decanter 8 can, for example, be in the form of a two-phase separating decanter, where the first phase comprises de-oiled suspension having a residual oil content of less than 6% by weight, based on the content of solids in the suspension, and the second phase comprises crude vegetable oil and, optionally, solid particles, dissolved in a disperse manner, and residual water.

Alternatively to a two-phase separating decanter, and within the scope of the present disclosure, the de-oiling can be carried out in a 3-phase decanter or in a combination of a clarifying decanter and a subsequent 3-phase separator.

The crude vegetable oil is collected in a container, or buffer tank, 9 and transferred by way of a third eccentric screw pump 10 and by way of a heat exchanger 11, for example, a plate heat exchanger, to a centrifuge 12. Disposed between the heat exchanger 11 and the centrifuge 12 there is a feed for hot water. This water, for example, advantageously has a temperature of from 60 to 80° C., or, for example, from 80 to 95° C.

The centrifuge 12 may, for example, be in the form of a three-phase separator, and in the separator both a separation of the water and oil phase and a clarification of the oil and water phases, removing solid particles, take place.

There is discharged from the centrifuge 12 a clear oil phase in the form of jatropha oil D, which can be processed further by neutralization and drying to give a product that is suitable for use as a fuel in combustion engines.

Furthermore, following the oil polishing, the residual water content of the oil phase can be lowered to a residual water content of about 0.05% or less by vacuum drying (not shown).

The content of free fatty acid can be reduced by the neutralization.

An important step in the optimization for obtaining oil from jatropha seeds A is the optimization of the adjustment of the pH value to ≤3.5.

A further advantageous increase in the yield, in accordance with the present disclosure, is achieved by the choice of a suitable acid, the dwell time, the ratio of crude oil and water and/or acid in the suspension, and the fine adjustment of the pH value.

Figure 2:
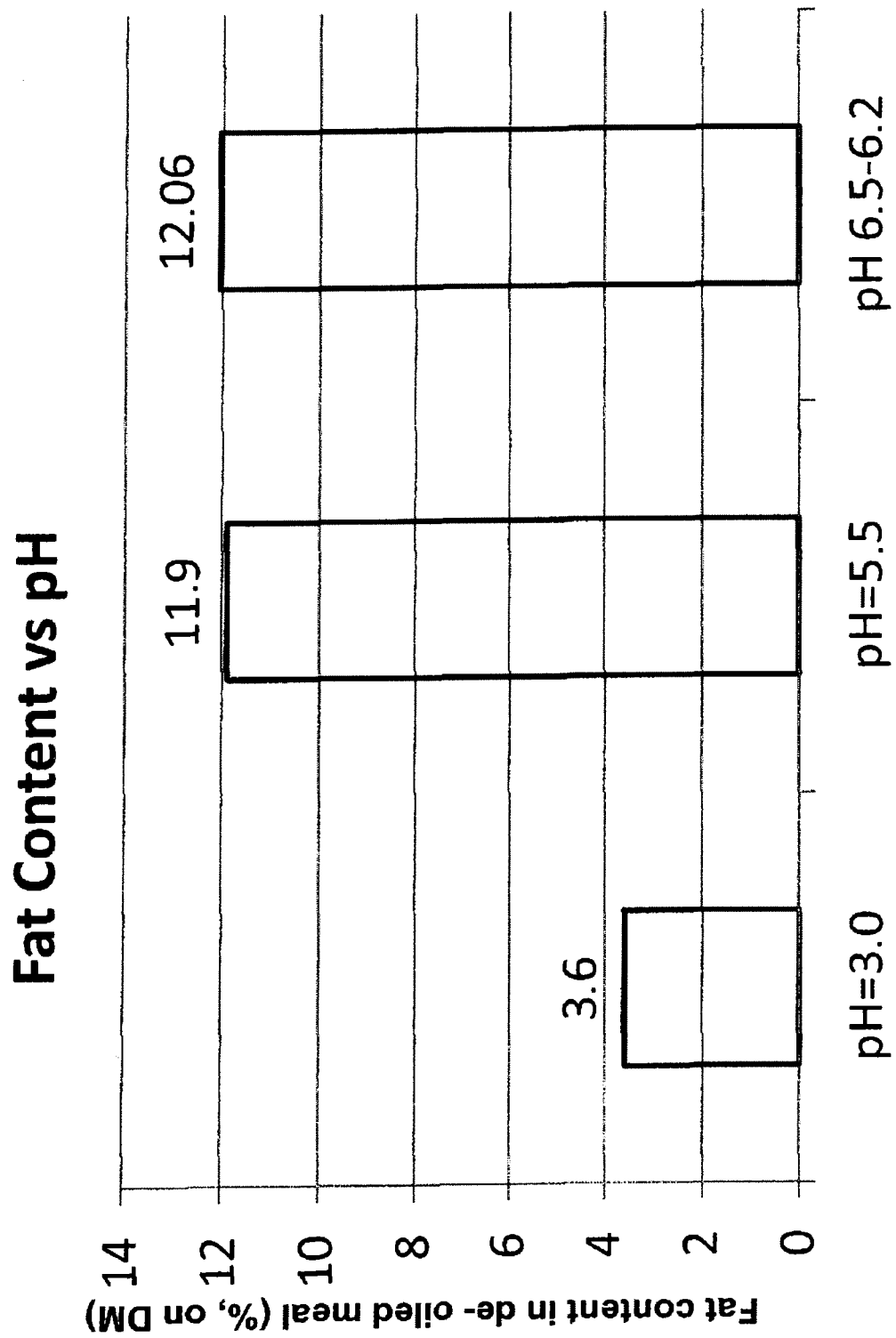
FIG. 2 shows a diagram illustrating the dependence of the oil content in the de-oiled suspension at different pH values, in accordance with the present disclosure.

FIG. 2 shows, in a diagram in accordance with the present disclosure, measured values of the residual oil content in de-oiled suspensions at different pH values, which suspensions were discharged from centrifuge 8. A lower residual oil content is significant for a better yield of jatropha oil and a higher protein content in the meal. A high residual oil content in the suspension accordingly reduces the yield of jatropha oil D obtained and lowers the protein content in the meal.

The temperature of the suspension was always 90° C., the dwell times in the dwell container were always 60 minutes, and the ratio of water to solid/oil mixture was always 1+1. The tests at pH=3 were carried out with hydrochloric acid. In the case of the suspension at pH=5.5, citric acid was used to adjust the pH value.

The different residual oil contents of the measured values depicted in the diagram do not show significant differences in the residual oil content at pH values between 5.5-6.5 and the residual oil content of an aqueous extraction in the neutral pH range. At a pH value of 3.0, however, a significant reduction in the residual oil content to 3.6% is to be observed. As is clear from the diagram at FIG. 2, an increase in the yield of jatropha oil is, surprisingly, noted when the pH value is lowered to below 3.0.

Figure 3:
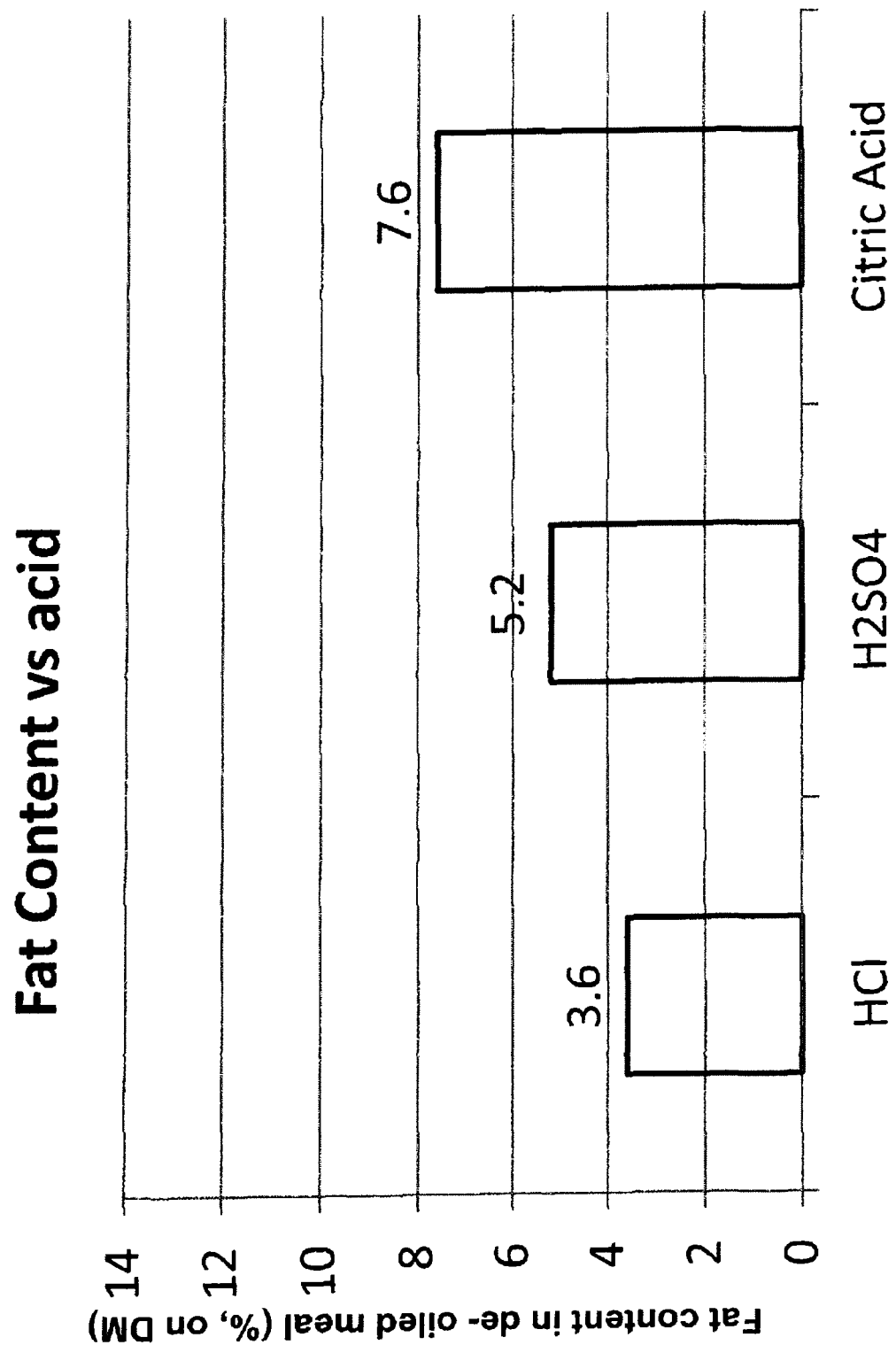
FIG. 3 shows a diagram illustrating the dependence of the oil content in the de-oiled suspension on the acid used, in accordance with the present disclosure.

In addition to the important factor of the pH value, the use of different acids also leads to varyingly high yields of jatropha oil D. In the diagram of FIG. 3, citric acid, hydrochloric acid and sulfuric acid in water were compared with one another under comparable measuring conditions. The temperatures of the suspension were always 90° C., the pH value of the solutions was always 3.0, the dwell times in the second buffer tank were always 60 minutes, and the ratio of water to the solid/oil mixture was always 1/1.

It is clear from FIG. 3 that extraction using hot water with the addition of hydrochloric acid is preferred to sulfuric acid and citric acid, because a particularly large amount of jatropha oil can, in that case, be extracted from the solids of the suspension.

Figure 4:
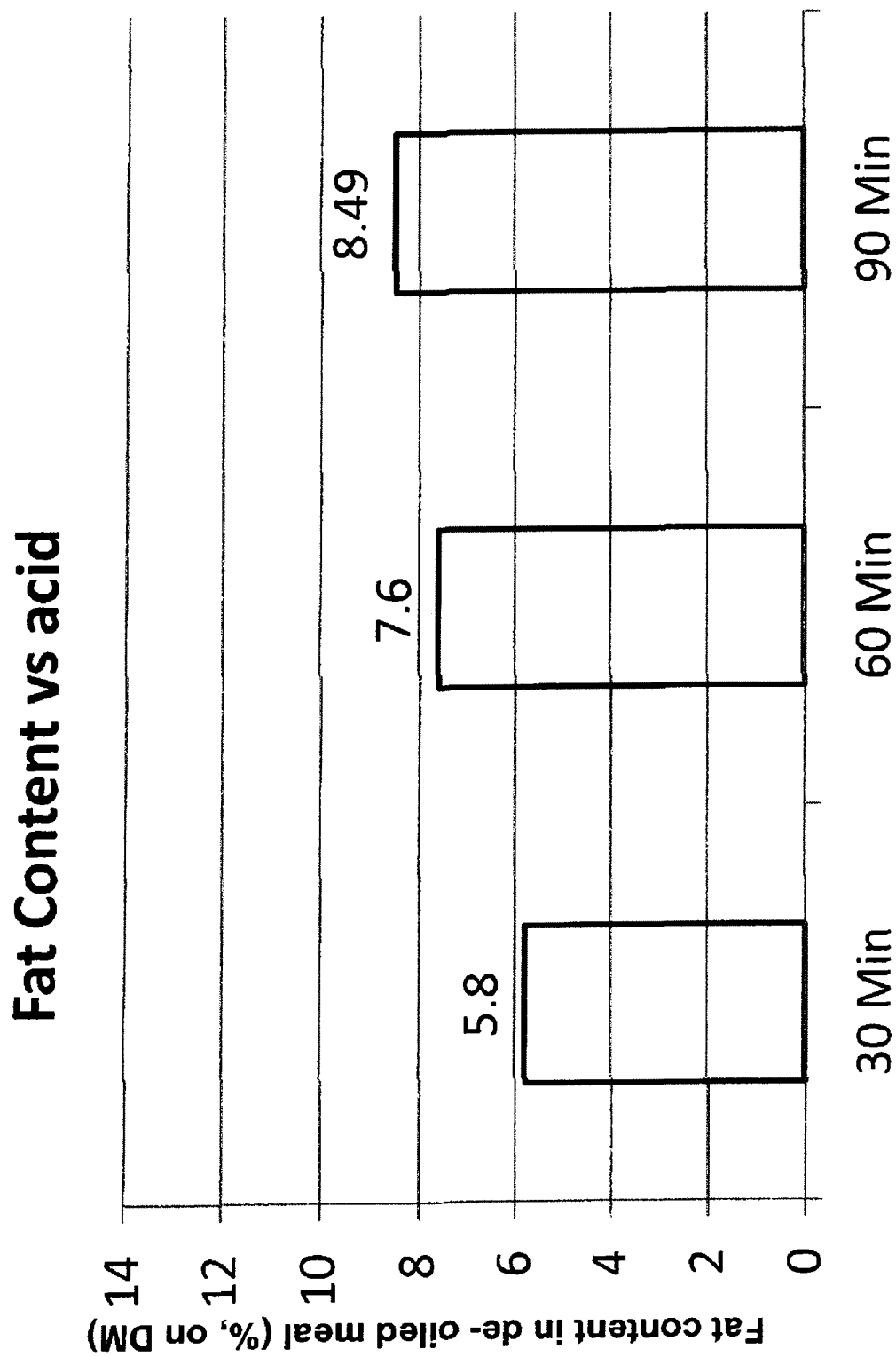
FIG. 4 shows a diagram illustrating the dependence of the oil content in the de-oiled suspension on the dwell time, in accordance with the present disclosure.

FIG. 4 shows a tendency concerning the dwell times of the suspension in the dwell container. These tests were carried out with addition of an aqueous citric acid solution at a pH value of 3.0. It can be seen that a dwell time of 30 minutes is sufficient to achieve the liberation of the oil phase from the suspension.

Too long a dwell time, for example, more than 60 minutes, in the dwell container leads to an increase in the residual oil content and accordingly to a reduction in the overall yield. The dependence on the dwell time is, however, also dependent at least in part on the acid used. The dwell time of from 30 to 60 minutes has thus been found to be particularly advantageous in the case of the use of HCl.

It has been found in tests, in accordance with the present disclosure, that an additional increase in the yield of fuel can be achieved if the ratio of water to product, after the addition of water and acid, is in the range of from 1/2 to 2/1.

The water content in the suspension, may, for example, be greater than 35% by weight, or, for example, be greater than 40% by weight.

It has been found, in accordance with the present disclosure, that a ratio of 1+1 between the solid/oil mixture and the aqueous phase, that is to say a water content of about 50% in the suspension, is particularly advantageous.

Figure 5:
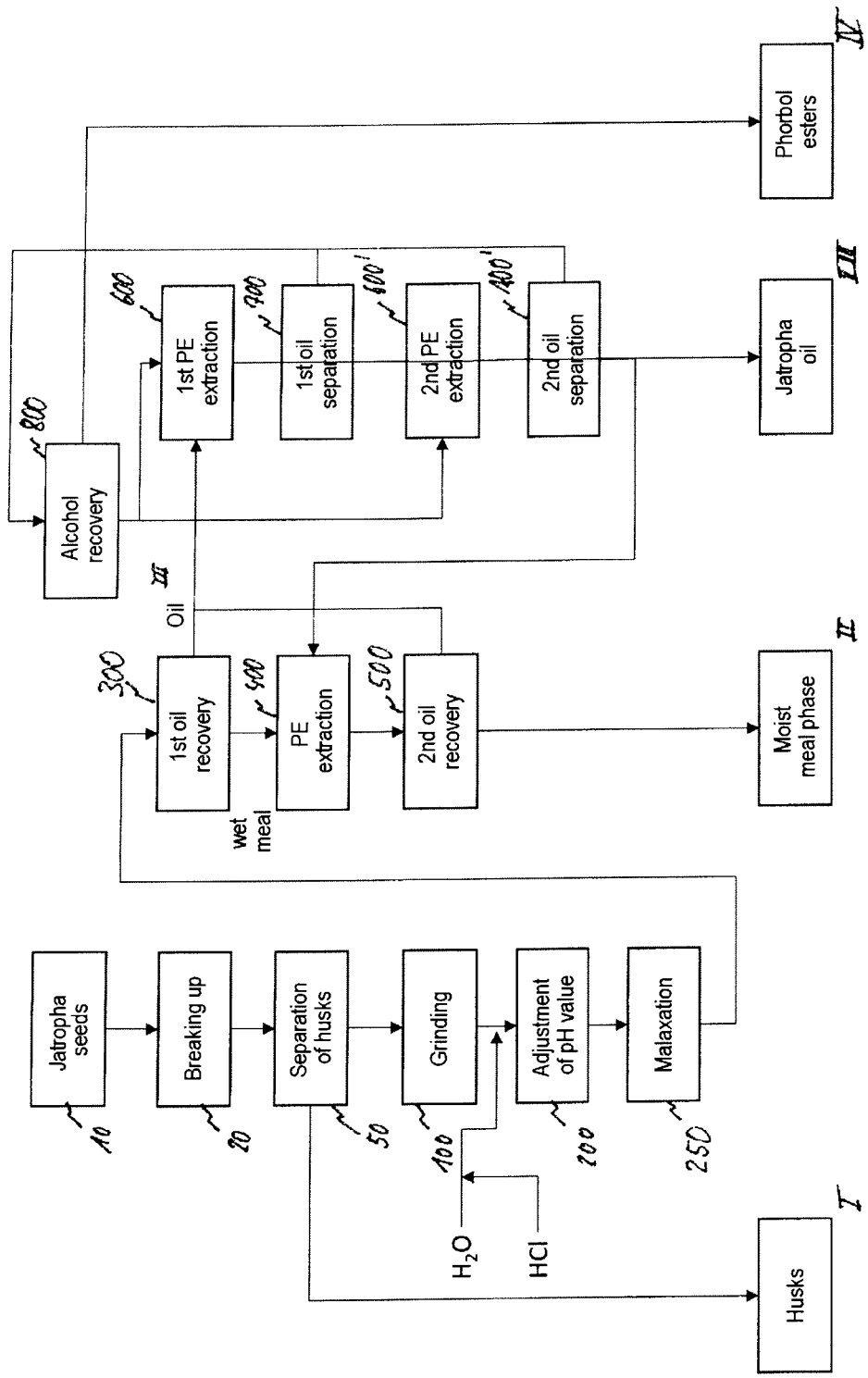
FIG. 5 shows a flow diagram illustrating a method sequence, in accordance with the present disclosure.

An embodiment of the present disclosure with regard to FIG. 5 is discussed below.

Following is a discussion that uses numbered steps related to FIG. 5.

Jatropha seeds are first made available in step 10.

The jatropha seeds are then broken up in step 20.

The jatropha seeds are then dehulled in step 50. The woody husk component of about 35-40% (w/w) is here separated off, and the protein content of the dehulled jatropha seeds is, accordingly, already increased in a simple manner as compared with the seeds from about 16% (w/w) to about 25% (w/w).

As well as increasing the protein content, about 16% of the phorbol esters are also discharged with the husks in the dehulling, and the amount of phorbol esters in the residual product is, accordingly, already reduced in a simple manner.

In a following step 100, the jatropha kernels are finely ground. Tests have shown that a fineness with 50% of the particles smaller than 22 with 10% smaller than 4 μm, and 90% smaller than 280 μm, effected optimum cell disruption. The plant cells are here disrupted sufficiently that the oil escapes from the cells and is free.

The material so disrupted is then mixed with water and stirred carefully in a stirred vessel. By lowering the pH value to pH <3.2 by addition of acid, it has been found, surprisingly, that the residual oil content could be reduced considerably and the oil yield could, accordingly, be increased significantly, as in step 200. Different acids affect the residual oil content to differing degrees.

Accordingly, the residual oil content of 15.5% (w/w) without pH adjustment could be reduced to 8.5% on addition of sulfuric acid. When hydrochloric acid was used, the residual oil content could be lowered to 3.5%.

Tests have shown that the yield of oil can be increased significantly by observing the optimum dwell time. The best results could be achieved with a dwell time of from 60 to 90 minutes, as in step 250.

A first separation then takes place in the centrifugal field, for example, in a decanter in step 300 and separation of jatropha oil, or crude jatropha oil, from the oil-containing suspension in the centrifugal field to form the jatropha oil fraction and the wet solid, or meal, fraction.

Surprisingly, it has also been found that the content of phorbol esters, or PE, both in the oil phase and in the solid phases, for example, husks and meal, is in this way lower than in the case of separation by screw presses, as discussed in test 7 below. Because that substance is to be classed as highly toxic, the decomposition of PE is to be regarded as an advantage over today's current method.

Accordingly, the amount of phorbol ester in the meal is reduced significantly, for example by 92%, in the aqueous method, while the reduction in the press cake was lower, for example, surprisingly, only 67%.

The phorbol esters remaining in the de-oiled solid, with a concentration of about 0.7 mg/g, are still to be classed as toxic, so that further steps are necessary to reduce the concentration further.

To that end, the de-oiled solid, or wet meal, is extracted with phorbol-ester-free oil, as in steps 400 and 500. These steps 400, 500 comprise the addition of vegetable oil, as part of step 400, and the separation of an oil phase from the wet meal, with the added oil, in the centrifugal field in step 500.

It is advantageous for the result if vegetable oil is used in step 400 in a ratio of from 1:10 to 1:1 of vegetable oil to a residual oil content in the meal fraction.

It is within the scope of the present disclosure to repeat steps 400 and 500 a number of times.

The phorbol ester content of the moist flour or meal/solid phase so obtained has been reduced sufficiently such that it can be used as a reusable material.

A particular advantage of this method, according to the present disclosure, is that oil as an extractant does not require any particular precautions in relation to explosion prevention and residue-free recovery.

In a test 8, see below, a commercially available rapeseed oil was used instead of extracted jatropha oil. 100 g of jatropha seed de-oiled by the above-described method were mixed with 10 g of rapeseed oil and centrifuged for 3 minutes at 4500 g in a laboratory centrifuge.

The oil freely present was separated off. The solid so de-oiled was dried and the phorbol ester content in the solid phase and in the oil phase was determined.

The phorbol ester content in the solid phase could be reduced from 0.68 mg/g to 0.38 mg/g. In the oil phase, the content of 0.00 mg/g, rapeseed oil addition, was increased to 2.65 mg/g in the mixed oil comprising the rapeseed oil and the residual oil in the meal. It is thus shown that phorbol ester can be extracted with vegetable oil.

The oil obtained overall in the above-described method, jatropha oil, mixed oil, is distinguished, surprisingly, among other ways, by a very low phosphorus, calcium and magnesium content, as discussed in test 6 below. The measured values were below the detection limit. Such low values can be achieved by conventional methods only to a limited degree, and then only with a considerable outlay by refining.

Because phorbol-ester-free vegetable oil is not always present, it is also within the scope of the present disclosure to use jatropha oil from which the phorbol esters have been separated beforehand. This is shown on the right in FIG. 5.

To that end, the phorbol-ester-containing oil from step 300 and optionally step 500 is extracted with alcohol in a first step, as in step 600. Various alcohols can be used for that purpose. An oil separation, as in step 700, is then carried out, for example, in a centrifugal field. This alcohol extraction of the oil phase can be repeated one or more times, as in, for example, steps 600', 700'. The alcohol is separated off with the phorbol esters in the oil separation of step 700, can be recovered, as in step 800, and can be used again for the extraction in step 600.

In that manner, the following fractions are obtained: a husk fraction I, which can be used, for example, as a combustion fuel, a moist flour or meal phase II, which can be used, for example, as animal feed, an oil phase III, which can be used as a fuel, and optionally also a phorbol ester phase IV, which can be used in the pharmaceuticals sector. The economy of this method is particularly high.

The use of alcohols as extractants in oils is to be regarded as unproblematic. Gas-tight, explosion-proof components can efficiently be used in embodiments of the present disclosure. Residual contents of alcohol, even methanol, are not critical because these oils are used mainly for processing to biodiesel. Methanol is added to the oil to produce biodiesel, and so residual contents of methanol are not a problem.

The extraction of phorbol esters by using alcohol has already been carried out on a laboratory scale and is described, for example, in the article "Optimization of conditions for the extraction of phorbol esters from Jatropha oil". It is simply an option within the scope of the present disclosure, for obtaining an oil having a reduced phorbol ester content for use in step 400.

In principle, however, step 400 can, within the scope of the present disclosure, be carried out with vegetable oil, for example, rapeseed or soybean.

Aspects of embodiments of the present disclosure are described in greater detail below.

Test 1:

800 g of jatropha seed, wild seed from Cape Verde, were broken manually by use of tongs. The husks were separated off manually. Breaking was carried out in such a manner that only a small amount of fines and dust formed. The seed, husks and flesh were analyzed. The seed contained 91% dry matter, or DM, which included 16% protein and 35.7% fat. The husk fraction of 298 g, or 37.7%, contained 91% DM, which included 3.3% protein and 0.4% fat.

The kernel fraction of 502 g, or 62.3%, contained 91% DM, which included 24.6% proteins and 56.5% fat.

The two fractions were separated in a visually pure manner, in each case merely with traces of the other fraction.

It is apparent in this respect that components of the jatropha seed that have a relatively low fat content are removed very effectively by manual dehulling.

Test 2:

1013 kg of jatropha seed, wild seed from Cape Verde, were dehulled by use of a test plant from Probat.

Breaking was carried out by use of a reflex breaker with a gap of 3 mm. The breaker was operated at 1300 rpm, the throughput was 308 kg/h, on average.

Separation of the husks was carried out in a pilot-scale air separator. The mean throughput was 296 kg/h.

The following fractions were obtained:
of kernel fraction (50%)
494 kg of husk fraction (48.8%)
12 kg of dust fraction from the separating cyclone (1.2%)

The husk fraction contained 91.4% DM, which includes 7.3% proteins and 7.8% fat.

The kernel fraction contained 91.2% DM, which included 19.8% proteins and 49.8% fat.

Both the kernel fraction and the husk fraction visually still contained components of the other fraction.

It is apparent in this respect that components of the jatropha seed that have only a relatively low fat content are also removed to a large degree by automated dehulling.

Test 3:

300 g of dehulled, ground jatropha seed were mixed in a glass beaker with 450 g of water and stirred for 60 minutes at 90° C. in a water bath. A pH value of 6.2 was established.

A further sample was adjusted to a pH value of 3.0 with 90 ml of HCl and likewise stirred for 60 minutes at 90° C. in a water bath.

The two samples were then centrifuged for 3 minutes at 4500×g in a heatable laboratory centrifuge.

The solids were then investigated for the residual fat content.

While the sample without pH adjustment had a residual fat content of 12.06%, based on DM, the residual oil content of the de-oiled sample with pH adjustment was only 3.6.

This shows the advantage of the pH value adjustment.

Test 4:

160 kg of water were heated indirectly to 95° C. in a heatable stirred vessel. 112 kg of dehulled, ground jatropha seed were then added. The suspension was adjusted to a pH value of 3.0 with 5.8 kg of concentrated hydrochloric acid, and the suspension was adjusted to a temperature of 90° C.

The suspension was stirred gently for 60 minutes in the vessel.

The suspension was then separated into an oil phase and a phase of de-oiled suspension in a CA 220-08-33 2-phase separating decanter from Wesffalia Separator Group GmbH. The bowl speed was 4750 rpm and the differential speed was 18 rpm.

The feed rate was 300 l/h and was set by use an adjustable eccentric screw pump.

The discharge rate of the oil phase was 63 l/h.

The de-oiled solid contained 34.8% DM, with 5.4% fat, based on dry matter DM.

Test 5:

180 kg of already de-oiled jatropha suspension with 34.8% DM and 5.4% fat, from test 4, in the dry matter DM were mixed in a stirred vessel with 50 liters of water.

The suspension was stirred gently for 30 minutes and during this was heated to 90° C. by use of an indirect heat supply.

The suspension was then separated into an oil phase and a phase of de-oiled suspension in a CA 220-08-33 2-phase separating decanter from Westfalia Separator Group GmbH. The bowl speed was 4750 rpm and the differential speed was 15 rpm.

The feed rate was 300 l/h and was set by use of an adjustable eccentric screw pump.

The discharge rate of the oil phase was 9 l/h.

The de-oiled solid contained 29.6% DM, with 3.9% fat, based on dry matter DM.

A comparison of tests 4 and 5 shows the advantage of forming the oil-containing suspension, in particular with prior separation of the husk constituents, as in test 4.

Test 6:

36 kg of jatropha oil so obtained were mixed in a stirred vessel with 1 liter of water and heated to 90° C. with an indirect heat supply.

The oil phase was then separated into an oil phase and an aqueous phase in a BTC 3-03-107 solid bowl centrifuge from Westfalia Separator Group GmbH. Solids in the oil were collected in the bowl of the centrifuge and removed after the test.

The aqueous phase contained 2.0% DM and had a fat content of 0.05%.

The oil phase had the following parameters:

carbon residue: 0.45% (m/m); oxidized ash: <0.005% (m/m); phosphorus: <0.5 mg/kg; sodium: <0.5 mg/kg; magnesium: <0.5 mg/kg; calcium: <0.5 mg/kg; potassium: <0.5 mg/kg; aluminum: <0.5 mg/kg; iron: <0.5 mg/kg.

The very low phosphate and magnesium content of the oil phase is very important.

According to test 4, an oil phase is first obtained. The yield can be improved by repeated de-oiling. The de-oiling steps of tests 4, 5 and 6, each of which is optional and in accordance with the present disclosure, confirm this improvement.

Test 7: Comparison of the End Products of Pressing Vs. Aqueous Methods.

150 g of dehulled, ground jatropha seed from test 2 were mixed in a stirred vessel with 190 kg of water. A pH value of pH=3.0 was established by addition of 9.5 kg of HCl (30%).

The suspension was stirred for one hour at a slow speed and heated to 90° C. by use of steam, applied indirectly.

The suspension was then separated into an oil phase and a phase of de-oiled suspension in a CA 220-08-33 2-phase separating decanter from Westfalia Separator Group GmbH. The bowl speed was 4750 rpm and the differential speed was 15 rpm.

The feed rate was 700 l/h and was set by use of an adjustable eccentric screw pump.

The de-oiled solid contained 33.8% DM, with 19.9% fat, based on dry matter DM.

The de-oiled suspension was mixed with 50 kg of water, heated to 90° C. in the stirred vessel and separated a second time into an oil phase and a phase of de-oiled suspension in the CA 220-08-33 2-phase separating decanter from Westfalia Separator Group GmbH.

The feed rate was 500 l/h and was set by use of an adjustable eccentric screw pump.

The de-oiled solid contained 27.9% DM, with 14.1% fat, based on dry matter DM.

In parallel, a sample of ground jatropha seed, from Cape Verde, that had not been dehulled was processed in a laboratory screw press.

670 g of seed were processed into pressed oil and press cake in a Komet CA59G screw press. The press was operated at a fixed speed and with a discharge gap of 8 mm.

422.6 g of press cake and 247.4 g of pressed oil were obtained. The oil still contained 10% (v/v) sediment, which was removed in a laboratory centrifuge.

Fine solids were then removed from the oil by vacuum filtration in a laboratory filter having a 0.45 micrometer pore size.

Oil samples and press cakes were analyzed and compared with the aqueous test.

| Phase | Analysis | Aqueous method | Screw press |
|---|---|---|---|
| Seed | DM (%, m/m) | 96 | 96 |
|  | Fat (%, on DM) | 32.2 | 32.2 |
|  | PE (%, on DM) | 0.225 | 0.225 |
|  | Protein (%, on DM) | 13.6 | 13.6 |
| Oil | PE (%, on DM) | 0.504 | 0.625 |
|  | Phosphorus (mg/kg) | 9.0 | 66.3 |
|  | Magnesium (mg/kg) | 3.0 | 17.1 |
| Husks | Fat (%, on DM) | 7.3 | — |
|  | Protein (%, on DM) | 7.3 | — |
|  | PE (%, on DM) | 0.06 | — |
| Meal | Fat (%, on DM) | 14.1 | 5.8 |
|  | Protein (%, on DM) | 46.1 | 25.9 |
|  | PE (%, on DM) | 0.07 | 0.10 |

The content of magnesium of the oil obtained in the aqueous method was reduced to values below the detection limit by simple washing with water.

Test 8: Extraction of PE by Use of Vegetable Oil.

100 g of product de-oiled by the aqueous method with 35.0% DM and 4.9% residual oil content were mixed in a glass beaker with 10 g of rapeseed oil and heated to 90° C. in a water bath.

The concentration of PE in the aqueous sample was determined as 0.026%. This corresponds to a concentration of PE based on the oil before addition of extraneous oil of 0.53%.

The rapeseed oil was free of PE.

After addition of the rapeseed oil, the arithmetic PE concentration of the mixed oil is 0.17%.

When the temperature was reached, the sample was separated into an oil phase and an aqueous solid phase by use of a laboratory centrifuge.

The heatable laboratory centrifuge was operated at 90° C. and 6000 rpm. This corresponds to a mean centrifugal acceleration of 4500×g. The samples were centrifuged for 3 minutes.

The PE concentration in the oil so obtained was 0.27%, the concentration in the de-oiled solid fell from 0.026% to 0.014%.

Test 9: Extraction of PE from Jatropha Oil by Use of Ethanol.

100 g of jatropha oil were mixed with 200 g of ethanol and heated to 50° C. in a water bath. In order to study the influence of the alcohol concentration, ethanol concentrations of from 30 to 90% (m/m) were used.

In order to prevent the alcohol and the oil from separating, the mixture was mixed intensively by use of a magnetic stirrer.

After a reaction time of 10 minutes, the mixture was separated into an oil and an alcohol phase in a heatable laboratory centrifuge.

The heatable laboratory centrifuge was operated at 50° C. and 6000 rpm. This corresponds to a mean centrifugal acceleration of 4500×g. The samples were centrifuged for 3 minutes.

The oil phase was carefully separated off and tested for PE:

| Concentration (alcohol % m/m) | PE (%, on DM) | PE reduction (%) |
|---|---|---|
| Oil | 0.304 | 0 |
| 0 | 0.275 | 9.54 |
| 30 | 0.299 | 1.64 |
| 50 | 0.255 | 16.5 |
| 70 | 0.114 | 62.5 |
| 90 | 0.070 | 77.0 |

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A method for the solvent-free fractionation of dehulled and comminuted jatropha seeds that have a phorbol ester content, in which at least the following fractions are obtained:
    a meal fraction having a reduced phorbol ester content relative to the phorbol ester content of the jatropha seeds;
    a jatropha oil containing phorbol esters;
    the method steps comprising:
    providing jatropha seeds;
    comminuting the jatropha seeds;
    adding water and acid to the comminuted jatropha seeds to form an oil-containing suspension, wherein the pH value of the suspension is adjusted to ≤3.5;
    separating jatropha oil from the oil-containing suspension in a centrifugal field to form the jatropha oil and the meal fraction;
    adding vegetable oil that is one of free of phorbol esters and has a reduced phorbol ester content, to the meal fraction; and
    separating an oil phase from the meal fraction in a centrifugal field.

2. A method for the solvent-free fractionation of jatropha seed that has not been dehulled and that has a phorbol ester content, in which at least the following fractions are obtained:
    a husk fraction;
    a meal fraction having a reduced phorbol ester content relative to the phorbol ester content of the seed; and
    a jatropha oil containing phorbol esters;
    the method steps comprising:
    providing jatropha seeds;
    dehulling of the seeds to form the husk fraction and a dehulled jatropha seeds;
    comminuting the dehulled jatropha seeds;
    adding water and acid to the comminuted jatropha seeds to form an oil-containing suspension, wherein the pH value of the suspension is adjusted to ≤3.5;
    separating jatropha oil from the oil-containing suspension in a centrifugal field, to form the jatropha oil and the meal fraction;
    adding vegetable oil that is one of free of phorbol esters and has a reduced phorbol ester content, to the meal fraction; and
    separating an oil phase from the meal fraction in a centrifugal field.

3. The method as claimed in claim 1, wherein the separated jatropha oil is a crude oil configured to be subject to oil polishing.

4. The method as claimed in claim 1, wherein the pH value is adjusted to ≤3.2.

5. The method as claimed in claim 1, wherein the added acid is hydrochloric acid.

6. The method as claimed in claim 1, further comprising the step of including a dwell time of at least 30 minutes before the separating of the jatropha oil.

7. The method as claimed in claim 1, wherein one or both of the separating steps occurs in a decanter, which produces the centrifugal field.

8. The method as claimed in claim 1, wherein the oil-containing suspension has a temperature of from 60 to 80° C. before separation of the oil phase.

9. The method as claimed in claim 1, wherein the oil-containing suspension has a temperature of from 80 to 95° C. before separation of the oil phase.

10. The method as claimed in claim 1, wherein a water-to-product ratio in the range of from 1:2 to 2:1 is established in the step of separating the jatropha oil.

11. The method as claimed in claim 1, wherein the water content of the oil-containing suspension is greater than 35% by weight based on the total mass of the suspension.

12. The method as claimed in claim 1, further comprising the step of cleaning the jatropha seeds before the comminuting of the jatropha seeds.

13. The method as claimed in claim 1, wherein the vegetable oil is added in a ratio of from 1:10 to 1:1 of vegetable oil to a residual oil content in the meal fraction.

14. The method as claimed in claim 13, wherein the vegetable oil is used in a ratio of 1:2 to the residual oil content in the meal fraction.

15. The method as claimed in claim 1, wherein the vegetable oil is a jatropha oil from which the phorbol esters have previously been separated.

16. The method as claimed in claim 1, wherein the vegetable oil is a jatropha oil that either has a reduced phorbol ester content in a ratio of 1:2 relative to a phobol ester content of the jatropha oil or is free of phorbol esters.

17. The method as claimed in claim 1, further comprising the step of drying of the jatropha seeds is carried out after a cleaning step and before the comminuting of the jatropha seeds.

18. The method as claimed in claim 1, wherein the separating of the oil phase is carried out by repeated de-oiling of the suspension.

19. The method as claimed in claim 1, wherein the phorbol ester content is in the form of a concentrate.

20. A method for reducing the phorbol ester content of a de-oiled jatropha seed meal, comprising the following method steps:
    providing de-oiled jatropha seed meal;
    adding vegetable oil that is one of free of phorbol esters and has a reduced phorbol ester content, to the meal, and
    separating an oil phase from the meal in a centrifugal field to obtain the meal having a reduced phorbol ester content.

21. The method as claimed in claim 20, wherein the steps if adding vegetable oil and separating the oil phase are conducted repeatedly.

22. The method as claimed in claim 2, wherein the separated jatropha oil is a crude oil configured to be subject to oil polishing.

23. The method as claimed in claim 2, wherein the oil-containing suspension has a temperature of from 60 to 80° C. before separation of the oil phase.

24. The method as claimed in claim 2, wherein the oil-containing suspension has a temperature of from 80 to 95° C. before separation of the oil phase.

25. The method as claimed in claim 2, further comprising the step of cleaning the jatropha seeds before the comminuting of the jatropha seeds.

* * * * *